March 12, 1968  P. BIRMAN  3,373,339
GENERATING ALTERNATING CURRENT BY REVERSING
A DIRECT CURRENT SOURCE
Filed June 7, 1965  2 Sheets-Sheet 1

INVENTOR.
PAUL BIRMAN
BY Alfred W. Barber
ATTORNEY

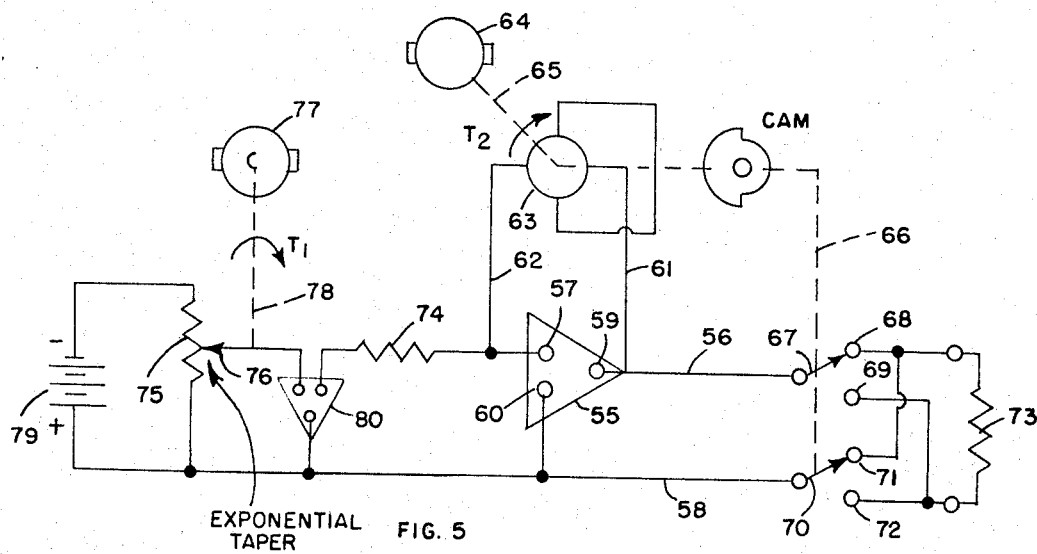
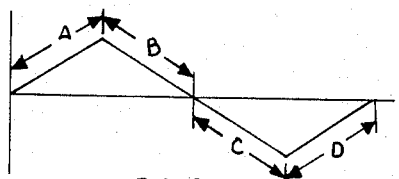
FIG. 6
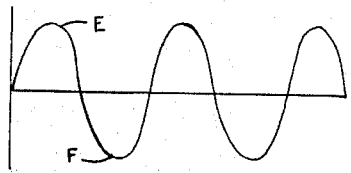
FIG. 7
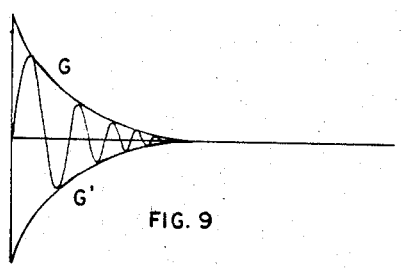
FIG. 9
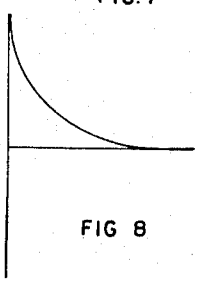
FIG 8
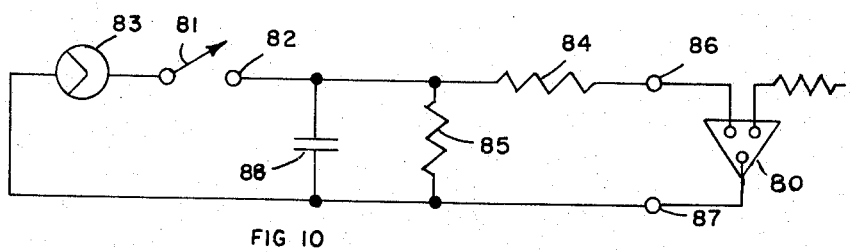
FIG 10

United States Patent Office 3,373,339
Patented Mar. 12, 1968

3,373,339
GENERATING ALTERNATING CURRENT BY REVERSING A DIRECT CURRENT SOURCE
Paul Birman, Flushing, N.Y., assignor to Forbro Design Corp., New York, N.Y., a corporation of New York
Filed June 7, 1965, Ser. No. 461,982
4 Claims. (Cl. 321—49)

ABSTRACT OF THE DISCLOSURE

In accordance with the present invention AC power may be derived from a programmable DC power supply generally capable of supplying unidirectional programmed output current in accordance with the command of a unidirectional programming means. The power supply and its program are to create DC output current starting and ending at zero. The invention also provides for reversing the polarity of the output by means of a suitable switch synchronized and phased with the programming means to effect the polarity reversal at the zero output points. In this way no transients or discontinuities are created in the output current and the output current is made bidirectional or in other words an AC output is created from unidirectional DC current.

---

The present invention concerns AC function programming of programmable power sources.

A regulated DC power supply may be defined as a power supply including means for maintaining the output voltage or current constant. A line regulated power supply is a power supply regulated to counteract changes in input line voltage. A load regulated power supply is a power supply regulated to provide constant output in spite of changes in load. Many regulated power supplies are line and load regulated.

It has been found that the power supply regulating means can often be used for programming the power supply. Programming means controlling the output of the power supply may be by means of an externally connected resistor, voltage source or current source. Such a power supply is called a programmable power supply. For example, a variable resistor properly connected to a resistance programmable power supply when varied will vary the output of the power supply in a predetermined manner according to the value of the resistance.

A programmed DC power supply can be made to provide a predetermined output having any value or series of values from zero to the maximum output capability of the power supply. Such a programmed DC power supply generally provides a unidirectional output. However, it is often required to provide an AC output, i.e., and output which is bidirectional, not ordinarily available from a DC power supply.

It has been found possible in accordance with the present invention to reverse the polarity of a DC power supply and hence to provide an AC output. A bidirectional or AC output must pass through zero and when passing through zero supplies no voltage or current to the load. It has been found possible to reverse the polarity of the output at the zero point thereby avoiding transients or other effects in the output circuit. It has been found possible to synchronize the operation of polarity reversing switch with a programming means to accomplish this conversion from DC to AC output. In addition it has been found possible to superimpose two programming means in such a way as to provide a modulated AC output as, for example, an exponentially varying AC output.

Accordingly one object of the present invention is to provide a method of and means for producing an alternating current output from a undirectionally programmable direct current power supply.

Another object is to provide an alternating current output from a programmable direct current power supply in accordance with a predetermined function, for example, sine wave, triangular wave, exponential, etc.

Still another object is to provide a modified AC output from a DC power supply in which the amplitude of the AC output is controlled in accordance with a predetermined function as, for example, an exponential function.

These and other objects of the present invention will be evident from the detailed description of the invention given in connection with various figures of the drawing.

In the drawing:

FIGURE 5 is a partly schematic, partly block diagram of another form of the present invention.

FIGURES 6, 7, 8 and 9 are typical output voltage function obtainable from the devices in accordance with the present invention.

FIGURE 10 is a circuit which may be used in conjunction with the form of the invention shown in FIGURE 5.

It is well known in the art that many regulated power supplies are programmable by means of externally connected resistors, sources of voltage or sources of current. The present invention applies to such power supplies, the internal details of which are not essential to its understanding.

Figure 1:
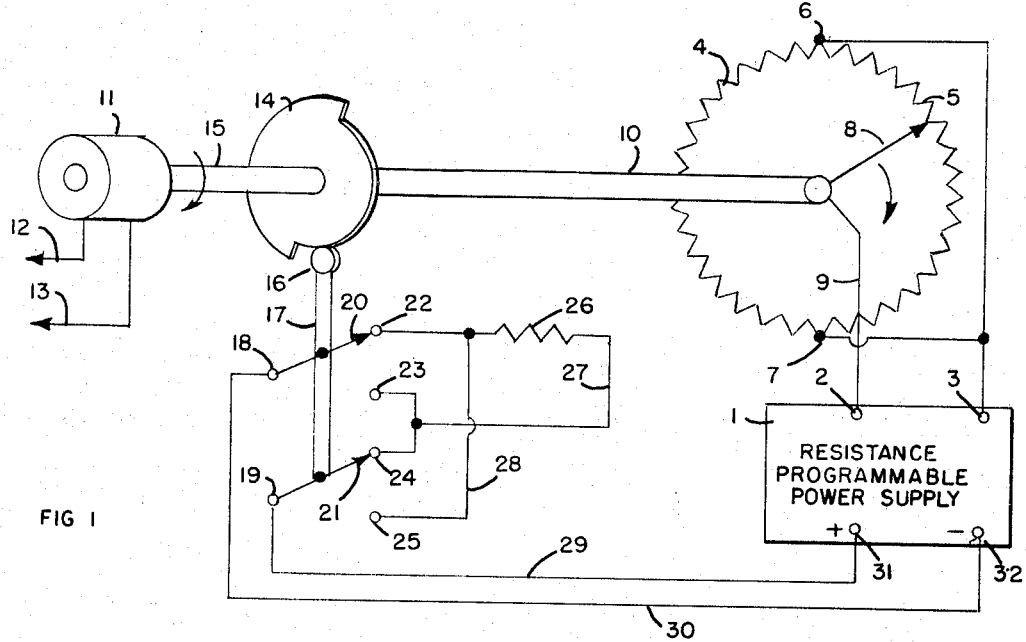
FIGURE 1 is a partly schematic, partly block diagram of one form of the present invention.
Figure 3:
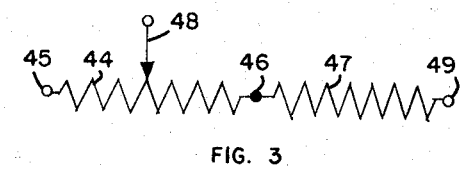
FIGURE 3 is a representation of a linear variable resistor suitable for use in the invention as shown in FIGURE 1.

The voltage programmable power supply 1 as shown in FIGURE 1 includes programming terminals 2 and 3 to which is connected resistance means 4–9 for the purpose of controlling or programming the output voltage or current of the power supply appearing across output terminals 31 and 32. The programming voltage is generated by a continuous resistance potentiometer 4–5 having diametrically opposite fixed contacts 6 and 7 and rotatable variable contact 8. The output from this potentiometer is taken between rotating contact arm 8 over lead 9 connected to terminal 2 and fixed contacts 6 and 7 connected to terminal 3. Arm 8 is rotated by suitable means such as shaft 10-15 driven by motor 11 which in turn receives its power over leads 12 and 13 from a suitable source, not shown. (The developed form of the resistance of potentiometer 4 is linear as indicated in FIGURE 3 with one linear portion 44 between 45 and 46 and another linear portion 47 between points 46 and 49. Points 45 and 49 are to be connected together and the two linear resistors are to be traversed by movable contact 48.) As arm 8 is rotated power supply 1 is programmed and an output voltage is generated which starts at zero when arm 8 is opposite fixed contact 7 and rises at a constant rate until arm 8 is midway between contacts 6 and 7 when it becomes a maximum and then decreases at a constant rate until it reaches zero again at contact 6. The output of the power supply between terminals 31 and 32 follows the same variation starting from zero, rising to a maximum and then returning to zero. This path of programming voltage and corresponding output voltage or current is illustrated in FIGURE 6 by portions A and B of the curve shown. This then illustrates the programming of a direct or unidirectional output current or voltage from the power supply. This programmed output is applied to the load represented here by a resistor 26 connected over leads 29 and 30, and switch contacts 18-20-22, 19-21-24, and leads 27 and 28.

In order to provide alternating current to load 26, the polarity of the output from power supply 1 is reversed as arm 8 passes from contact 6 back to 7. This is accomplished by switching arm 18-20 from contact 22 to contact 23 and arm 19-21 from contact 24 to contact 25. This switching is carried out when arm 8 is opposite contact 6, that is, at the instant when the output of the programmed power supply is zero. Shaft 15 carries a cam 14 on which rides an actuator 16 coupled to switch arms 20-21 by means of link 17. The steps in the cam are phased to actuate the switch at the instant when arm 8 is opposite terminal 7 in one direction and when opposite terminal 6 in the opposite direction. Thus, the polarity of the current or voltage across load 26 is reversed as arm 8 passes points 6 or 7 and is programmed as shown first from A to B and then from C to D in the curve of FIGURE 6. This then represents an alternating current or voltage across load 26 derived from the direct current programmable power supply 1.

Figure 4:
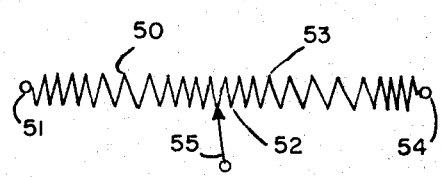
FIGURE 4 is a representation of a sine function variable resistor suitable for use in the invention as shown in FIGURE 1.

While the above description sets forth the method of and means for generating a load voltage or current having a triangular wave form, it will be seen that other wave forms may be generated by changing the law of variation of resistor 4-5 from linear to another predetermined form. For example, a sine wave alternating current or voltage may be provided across the load by changing the form resistor 4-5 to one having a sine wave function variation. FIGURE 4 suggests such a sine wave form in which resistor 50 is distributed in accordance with a half sine wave function the rate of change being maximum at the ends adjacent to points 51 and 52 and a minimum in the center. Resistor 53 is similarly tapered between points 52 and 54. Ends 51 and 54 are joined and the resistor formed into a circular shape so that contact arm 55 can ride around a continuous circular path formed by resistors 50 and 53 in series and will provide a sine function output voltage when utilized to resistance program power supply 1. The resulting alternating current sine wave is illustrated in FIGURE 7 where E represents one half of the wave generated by one half revolution of the contact arm and F represents the second half upon polarity reversal (see above description of FIGURE 1).

The alternating current provided as set forth above may be modified by a second periodic control so that, for example, an exponentially varying alternating current may be provided to the load. FIGURE 5 illustrates one way in which this modified alternating current may be provided. A voltage programmable power supply 55 having an output terminal 59, a common terminal 60 and a program terminal 57 is connected to a load 73 through reversing switch 67-68-69-70-71-72. Resistance programming with a suitable rotating variable resistor 63 driven by motor 64 over shaft 65 serves to provide the alternating current output when switch 67 through 72 is synchronized to reverse polarity at zero cross-overs by means of the cam driven coupling 66 as set forth above. This programming resistor 63 is connected between output terminal 59 and programming terminal 57 by means of leads 61 and 62. The exponential function or control (see FIG. 8) to be superimposed on the alternating current output by voltage programming to provide a resultant as shown in FIGURE 9 by an exponentially programmed voltage fed to the programming terminal 57. A suitable means for supplying this exponential voltage current includes a voltage source such as battery 79 shunted by an exponentially tapped potentiometer 75 having a variable contact arm 76. This contact arm is rotated by a suitable means such as motor 77 coupled to arm 76 by means of drive 78 thereby providing an exponentially varying periodic voltage between arm 76 and common lead 58. This voltage is used to provide an exponentially varying voltage by connecting the impedance transforming operational amplifier 80 and resistor 74 between arm 76 and programming point 57. The resulting voltage or current at load 73 will be an exponentially varying voltage or current as illustrated in FIGURE 9.

While the system illustrated in FIGURE 5 will generate a repeating exponentially varying current it is often desirable to generate an exponential voltage or current which starts at a predetermined value and then decays exponentially without repeating or building up again. This may be accomplished. for example, by means of the exponentially decaying voltage generator shown in FIGURE 10 and used to voltage program the power supply. A capacitor 88 is charged to a predetermined value by closing switch 81-82 to connect a source of current 83 across capacitor 88. When capacitor 88 has been charged, switch 81-82 is opened and capacitor 88 is allowed to discharge through suitable resistors such as 85 and 84. The common side 87 is connected to common lead 58 (FIGURE 5) and the terminal 86 which provides the exponentially decaying voltage is connected through impedance transforming amplifier 80 to program terminal 57. The values of resistors 85 and 84 are chosen to provide the desired rate of decay of the exponential voltage.

Figure 2:
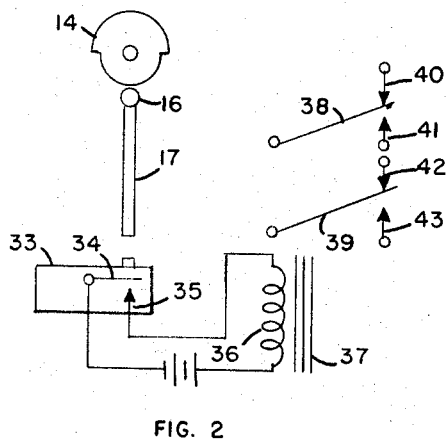
FIGURE 2 is the circuit diagram of a relay operated reversing switch suitable for use in the system shown in FIGURE 1.

FIGURE 2 illustrates an alternate method of actuating a reversing switch. The switch contacts 38-40-41 and 39-42-43 are actuated by means of relay 36-37 which in turn is energized when microswitch 33 is closed (contacts 34-35). Microswitch 33 may be actuated by the same cam 14, actuator 16 and link 17 as was used in connection with FIGURE 1 above.

While only a few forms of the present invention have been shown and described, many variations will be apparent to those skilled in the art and within the spirit and scope of the invention as set forth in particular in the appended claims.

What is claimed is:
1. In an alternating current generating system, the combination of, a programmable direct current electronically regulated power supply capable of providing programmed direct current output to output means, cyclically variable unidirectional programming means for providing unidirectional predetermined control functions starting and ending at zero connected to program said direct current power supply, and polarity reversing means connected to said output for reversing the polarity of said direct current output and coupled to said programming means in predetermined phase relation for providing said reversals at zero output current whereby said direct current output is cyclically programmed and reversed in polarity at zero output to provide an alternating current output to said output means.

2. An alternating current generator as set forth in claim 1 wherein said predetermined function is substantially a half cycle of a sine wave.

3. An alternating current generator as set forth in claim 1 wherein said predetermined function is substantially triangular in form.

4. An alternating current generator as set forth in claim 1 and including additional programming means coupled to the first said programming means for modifying the function generated in response to the first said programming means.

References Cited

UNITED STATES PATENTS 1,703,242  2/1929  Kukel _____ 321—49 X
3,162,833  12/1964  Maclain _____ 338—89
3,284,697  11/1966  May _____ 323—74

FOREIGN PATENTS 1,151,584  8/1957  France.

OTHER REFERENCES

Kepco Power Supply Handbook, by P. Birman, 1965, by Kepco Inc., Flushing, N.Y., pp. 19–30 relied upon, Sci. Lib. TK451, K4B5.

JOHN F. COUCH, *Primary Examiner.*

G. GOLDBERG, *Assistant Examiner.*